Jan. 16, 1968   R. W. OSBORNE, JR   3,364,297
MECHANICAL SIMULATOR
Filed June 1, 1964   3 Sheets-Sheet 1

INVENTOR.
ROBERT W. OSBORNE JR,
BY
ATTORNEYS.

Jan. 16, 1968　　R. W. OSBORNE, JR　　3,364,297
MECHANICAL SIMULATOR
Filed June 1, 1964　　3 Sheets-Sheet 2

INVENTOR.
ROBERT W. OSBORNE JR.,
BY
ATTORNEYS

Jan. 16, 1968  R. W. OSBORNE, JR  3,364,297
MECHANICAL SIMULATOR

Filed June 1, 1964  3 Sheets-Sheet 3

INVENTOR.
ROBERT W. OSBORNE JR.,

BY

ATTORNEYS.

3,364,297
MECHANICAL SIMULATOR
Robert W. Osborne, Jr., 9364 Floral Ave.,
Blue Ash, Ohio
Filed June 1, 1964, Ser. No. 371,401
7 Claims. (Cl. 35—10.2)

ABSTRACT OF THE DISCLOSURE

Device for mechanically simulating operating characteristics of aircraft navigation equipment including means for indicating a magnetic heading and a cam selectively movable with the indicating means and independently of the indicating means, and an appropriate indicator responsive to movement of the cam.

---

This invention relates to aircraft navigation equipment, and more specifically to a device for readily and inexpensively teaching aircraft pilots the use of such equipment.

Electronic navigation is becoming more and more common. This is in part necessitated by the increased popularity of private or sport flying, and in part by the increased speed, ceiling and range of aircraft available to such pilots. For example, it is not unusual today for a small business man to own and operate his own aircraft for both business and recreational purposes. With new and improved planes he is able to take longer and longer flights under conditions where contact navigation becomes impractical, or completely impossible.

As is well known in the art, many of the planes operating today are not equipped with electronic navigation equipment of any sort. In fact, many of the smallest of the private planes now in existence do not even have an electrical system which could be used to operate such equipment. Therefore, in order to learn how to use such equipment, the student or private flyer must rent a completely equipped airplane, which of course, will be relatively expensive, and in addition, engage a pilot familiar with the use of such equipment, so that his actual training may be acquired in the air. Such training is entirely satisfactory, but is highly expensive and has been a deterrent to many pilots preventing them from learning the use and value of navigation equipment.

Accordingly, it is a principal object of this invention to provide a teaching unit which can be used on the ground, and which will simulate the actual movements and indications which would be received by the actual equipment under operating conditions.

Among the most common of the modern navigation devices is the VHF Omni Range receiver. As will be explained in more detail hereinafter, an airplane pilot can use the VHF Omni Range navigation equipment to determine his exact bearing to or from a given radio station on the ground. If, of course, the aircraft is equipped with two such receivers, the operator is able by triangulation to obtain a precise fix for the location of the aircraft at any given time.

It is therefore a more specific object of this invention to provide a device for classroom teaching of the use of VHF Omni Range navigation equipment.

A further object of the invention is to provide such a device which is entirely mechanical and self-contained, and requires no power source such as electricity.

Still a further object of the invention is to provide a mechanical simulator which is extremely simple in construction, and can be readily and economically produced.

Various other objects and advantages of this invention will become apparent to the skilled worker in the art as the specification proceeds. It will be understood that the following description of a specific embodiment of the invention is exemplary only, and intended to provide a full and complete understanding of the invention.

Reference will be made from time to time to the accompanying drawings, in which.

To facilitate a complete understanding of the invention, the VHF Omni Range navigation system will be described. The ground component of such a system includes a large number of VOR (VHF Omni-Range) stations, each of which transmit radio signals in the form of 360 radials, spaced one degree apart. Each of these radials has two "names." For example, the radial which is designated as "45° from" the station is also "225° to" the station.

The airborne receiver usually includes an Omni-bearing selector (OBS) controlled by the pilot, a "To-From" meter, and a "Left-Right" needle.

By way of example, assure that a pilot wishes to know the magnetic heading directly to a predetermined VOR station. He rotates the OBS selector, watching the "To-From" and "Left-Right" meters. When the "Left-Right" needle centers, he will look at the OBS reading, which for example may be 225°, telling him that he is centered on the 225° radial, and then he will look at the "To-From" meter which in this example may indicate "From." In this case, he knows that at his position, a magnetic heading of 225° will take him directly away from the VOR station he has selected. But, since his original desire was to fly "To" the station, he can simply mentally subtract 180° from the reading of the OBS dial, or he can continue to turn the OBS knob until the "Left-Right" needle again centers, and the "To-From" meter registers "To." The "Left-Right" needle will recenter when the OBS shows "45°."

To more fully illustrate the various conditions which the device of this invention must simulate, FIGURES 6 through 11 graphically illustrate a plurality of aircraft positions with respect to a predetermined VOR station, and show the indications as seen by the pilot on the aircraft receiver for each of the designated positions. It is assumed throughout that the pilot wants to leave the designated VOR station on the 45° "From" radial, so he has set the OBS dial to 45°.

Figure 6:
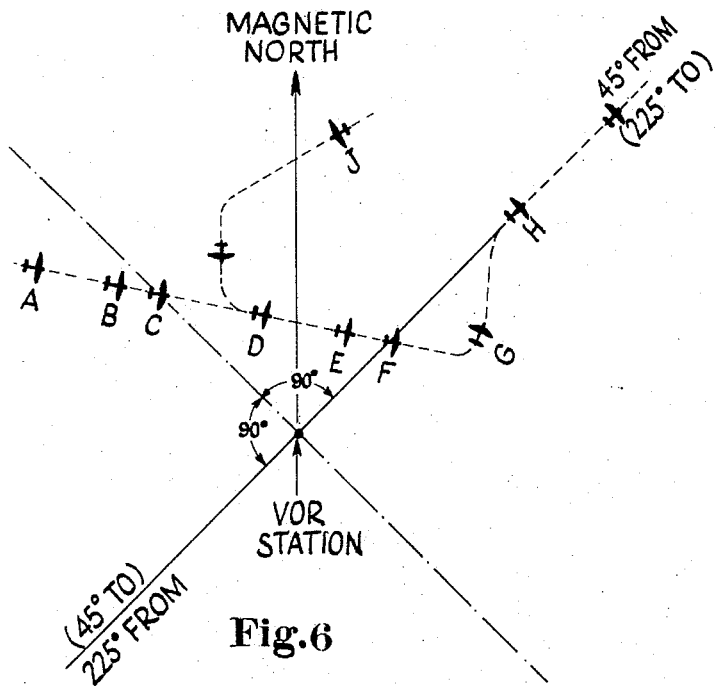
FIGURE 6 is a diagrammatic showing of a plurality of aircraft positions with respect to a ground station.
Figure 7:
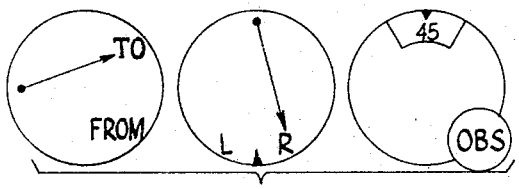
FIGURE 7 is a composite view showing the indications observed on the aircraft receiver when in positions A or B of FIGURE 6.
Figure 8:
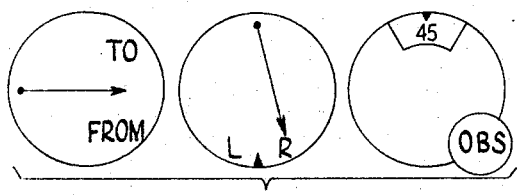
FIGURE 8 is a composite view showing the indications observed on the aircraft receiver when in position C of FIGURE 6.
Figure 9:
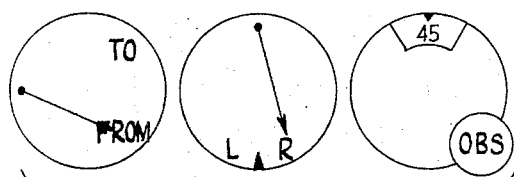
FIGURE 9 is a composite view showing the indications observed on the aircraft receiver when in positions D, E, J, and K of FIGURE 6.

It will be observed that the "To-From" needle moves from one side to the other when the aircraft crosses the radial which is 90° from the selected radial; this occurs at the point C in FIGURE 6; see also the dials in FIGURE 8.

Figure 10:
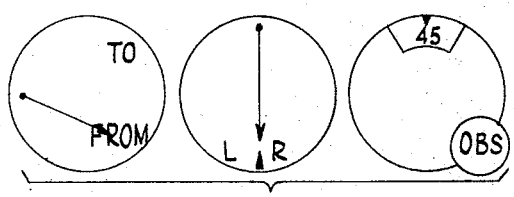
FIGURE 10 is a composite view showing the indications observed on the aircraft receiver when in positions F, H, and I of FIGURE 6.
Figure 11:
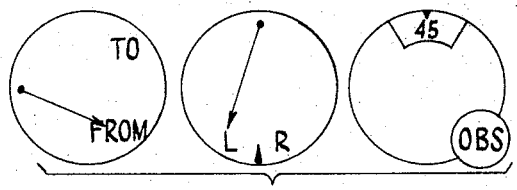
FIGURE 11 is a composite view showing the indications observed on the aircraft receiver when in position G of FIGURE 6.

Similarly, the "Left-Right" needle centers only when the aircraft is centered on the desired radial; for example, see positions F, H, and I, and the corresponding indications shown in FIGURE 10. Note that at positions D, E, J and K, the pilot will read the same indications on the instrument, even though the aircraft is at a series of different headings. The "Left-Right" needle simply shows, with respect to the desired radial and facing in the direction of the station, which side of the desired radial the aircraft is on. In other words, it will be apparent that the combination of indications on the "Left-Right" needle and the "To-From" meter will simply show the pilot which quadrant he is in, and do not necessarily indicate that by turning the aircraft to the right, he will reach the desired radial.

Turning now to FIGURES 1 through 4, the preferred embodiment of the mechanical simulator of this invention will now be described. Beginning at the bottom of this figure, the essential components of the device include a housing or a base 10, the ring gear/cam 20, the cam followers 30 and 31, the bearing indicator 40, the bearing selector drive gear 45, the front panel 50, the "Left-Right" indicator needle 60, and the glass or plastic cover plate 70.

As is clearly seen in FIGURE 1, the housing 10 which may be formed of wood, metal, plastic or any suitable material, is machined to include the annular groove 11, which will accommodate the cam 20 and bearing indicator 40, as described in more detail hereinafter. The base 10 is also machined to include the crossed slots 12 and 13, which receive respectively the cam followers 30 and 31.

The radius of the outer edge of the annular groove 11 will be of a size to just receive the cam 20 and bearing indicator 40, the outside diameter of which elements are substantially the same. The radius of the inner surface of the annular groove 11 will be equal to the radius of the hole in the center of the bearing indicator 40, an equal to the radius of the portion 21 of the internal cam surface of the cam 20.

The internal camming surface of the cam 20 is provided with the portion 22 having a predetermined radius, with the portion 21 having a somewhat smaller radius. It will be observed that each of these portions 21 and 22 are of an arcuate length approaching 180°. The importance of this surface will become apparent in connection with the description of the cam followers.

The cam followers 30 and 31 respectively are provided with the opposed notches 32 and 33, whereby they may be received in the slots 12 and 13 in the housing 10 in crossed, interlocking relationship, each of the cam followers being reciprocable in its respective slot 12 or 13.

It will be noted that the cam followers 30 and 31 (and the slots 12 and 13) are oriented substantially 90° from each other. This means that with the cam oriented as shown in FIGURE 1, the cam follower 30 will be moved to the rear right to an extreme position, while the cam follower 31 will be almost exactly centered, its ends resting on the portions of the internal cam surface 23 and 24 joining the arcuate portions 21 and 22. The importance of this relationship will be more fully explained hereinafter.

The bearing indicator 40 is provided on its top surface with suitable indicia indicating the full circle of 360°. As noted before, the outside diameter of the bearing indicator 40 will be substantially the same as the outside diameter of the cam 20; and it will further be noted that both of these elements are provided with a plurality of gear teeth about their outer edges. Preferably, the cam 20 and bearing indicator 40 will each have 60 teeth, which will insure a maximum setting error in the mechanical simulator of this invention of 6°, which is substantially equal to the maximum allowable error in the real equipment.

Figure 3:
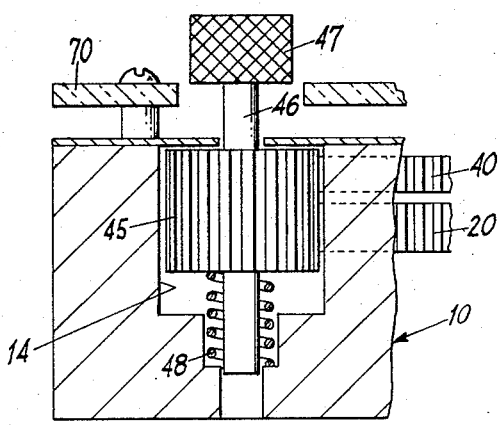
FIGURE 3 is a cross-sectional view of a portion of the device shown in FIGURE 1, showing the driving gear in one position of its operation.
Figure 4:
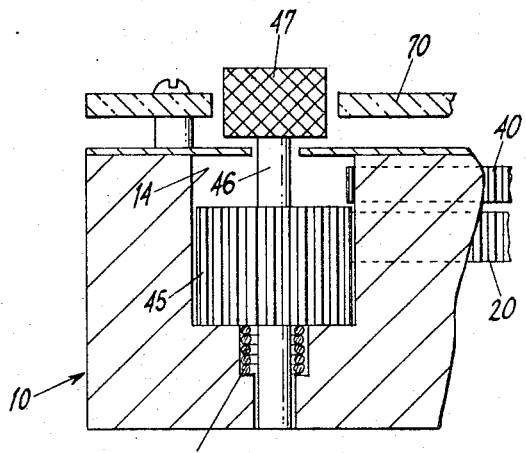
FIGURE 4 is a cross-sectional view similar to FIGURE 3 showing the driving gear in another operating position.

The bearing indicator 40 and cam 20 may be rotated at the same time by means of the driving pinion 45 suitably fixed to the shaft 46, and being received in the opening 14 in the housing 10. As seen in FIGURE 3, the compression spring 48 is placed around the shaft 46 and below the driving gear 45, to normally urge this gear to the position shown in FIGURE 3, wherein it is in meshing engagement with both the bearing indicator 40 and the cam 20. It will therefore be apparent that rotation of the knob 47 serves to drive both the bearing indicator 40 and the cam 20. However, upon depressing the knob 47 and gear 45 against the resistance of spring 48 (as shown in FIG. 4), it will be seen that the gear 45 now engages only the cam 20. Therefore, rotation of the knob 47 and gear 45 will serve to drive the cam 20 independently of the bearing indicator 40. In this manner, the operator is able to set a problem into the device, which problem must later be solved by the student.

Secured to the top surface of the housing 10, in any suitable manner as by the bolt 71 is the front plate 50. The plate 50 is provided with the arcuate openings 51 and 52, through which the various indicia on the bearing indicator 40 are visible. The aperture 51 is provided with the indicator 54, under which the operator will set the desired bearing. The pointer 55 and the aperture 52 will show a reading 180° spaced from the reading under the pointer 54. The front plate 50 is also provided with the opposed triangular apertures 56 and 57 through which the "To-From" indicator means presently to be described is visible.

Between the apertures 57 and 52 are the colored arcuate segments 58 and 59. The former is generally colored blue, while the latter is generally colored yellow. The line separating these two segments represents the center line for the "Left-Right" needle 60.

The glass cover plate 70 is secured by means of the screws 71 and spacers 72 in a position spaced above the front plate 50. If desired, the circular central portion of the cover 70 may be left transparent, while the peripheral portion may be colored in any suitable tone.

Turning now to a consideration of the "Left-Right" needle and the "To-From" indicator, it is contemplated that these indicators will be responsive to movement of the cam followers 30 and 31 respectively. In this connection, it will be seen that the "Left-Right" needle 60 includes a pivotal axis 61, and a downwardly extending finger 62, which is substantially parallel to but spaced from the pivotal axis 61. The pivotal axis 61 of the needle 60 is received in the hole 15 in the housing 10, through the longitudinal slot 34 in the cam follower 30. The finger 62 of the "Left-Right" needle is received in the transverse slot 35 in the cam follower 31. It is therefore apparent that movement of the cam follower 30 will have no effect on the position of the needle 60, while movement to the right of the cam follower 31 will cause the needle to move from a position overlying the segment 58, to a position overlying the segment 59, or, when the cam follower 31 is in engagement with the portions 23 and 24 of the cam surface, the needle will be in a centered position.

Figure 1:
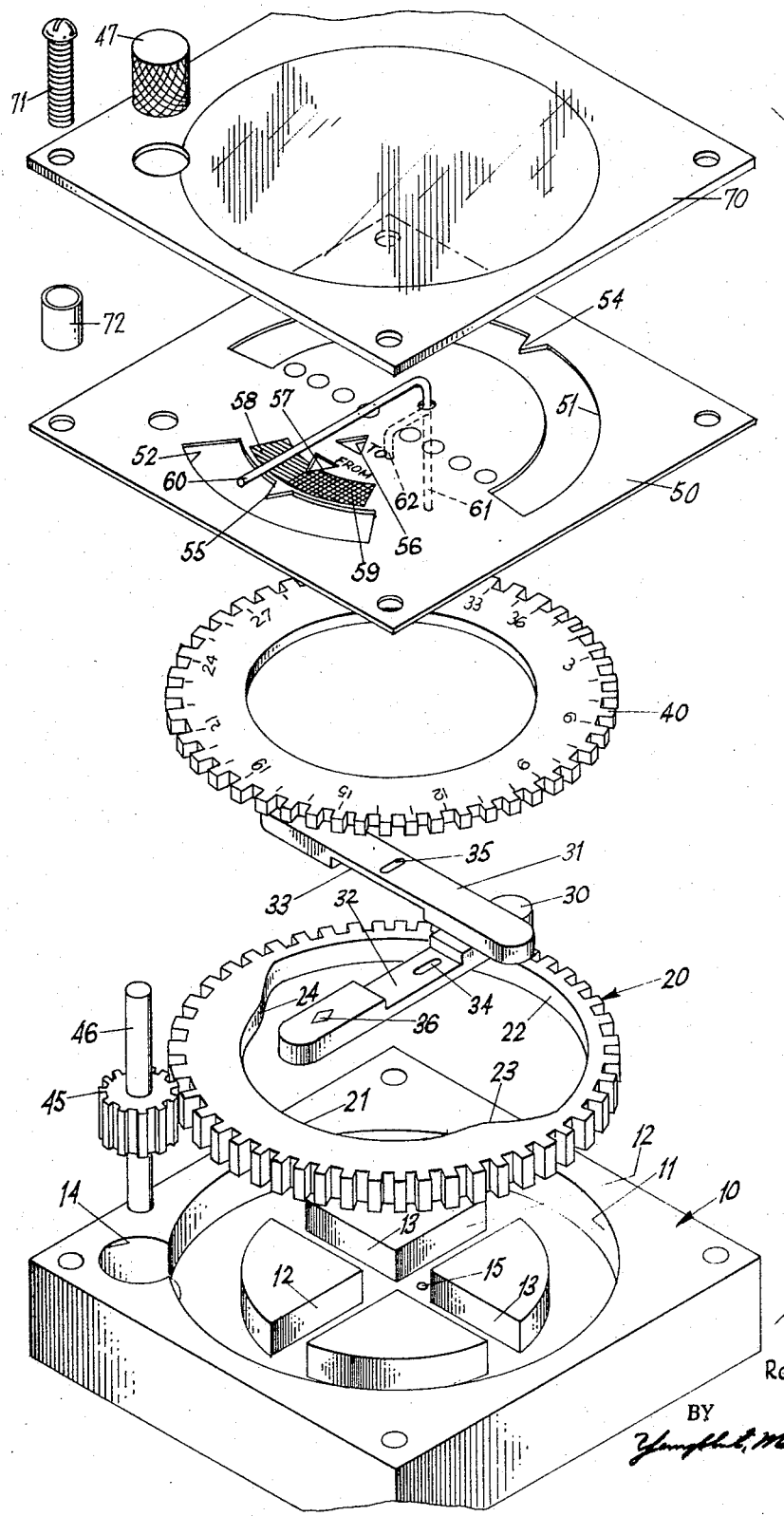
FIGURE 1 is an exploded perspective view of the preferred embodiment of the invention.
Figure 2:
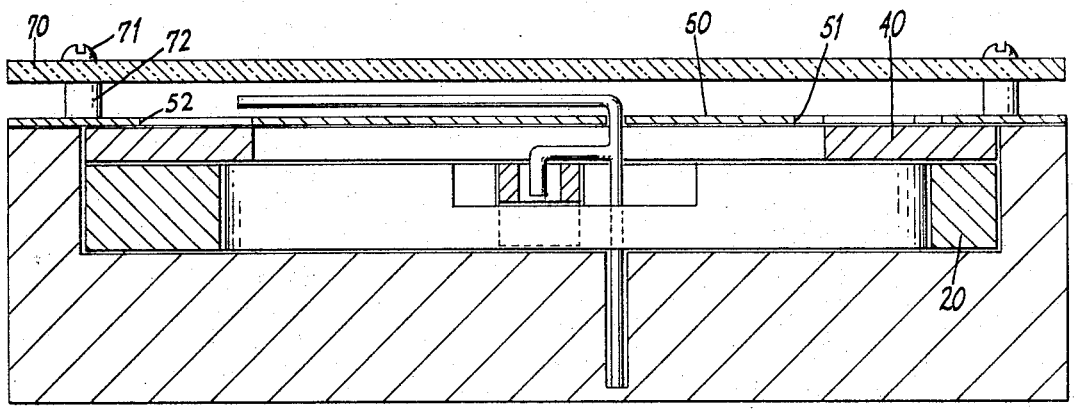
FIGURE 2 is a cross sectional view of the assembled device of FIGURE 1.

It will be seen in FIGURE 1 that the front end of the cam follower 30 is provided with a contrasting color diamond shaped mark 36. The rear and front halves of this mark respectively will register with the apertures or windows 56 and 57 in the cover plate when the cam follower 30 is located in either of its two extreme positions.

It is believed that operation of the device will now be clear. In one exemplary mode of its use, the instructor rotates the knob 47 until the desired radial (in degrees)

rests under the pointer 54 on the front plate 50. He then depresses the knob 47 and driving gear 45, thereby rotating only the cam 20 until the "Left-Right" needle centers, and either a "To" or "From" flag (whichever is appropriate) appears in the window 56 or 57 respectively. Thereupon the knob 47 is released, permitting the gear 45 to be urged to its uppermost position, and the unit can be "detuned" by the instructor simply rotating the knob. The student is then free to rotate knob 47 and learn to interpret the readings the simulator presents. It will, of course, be apparent that many other modes of operation and instruction with this device are possible.

Figure 5:
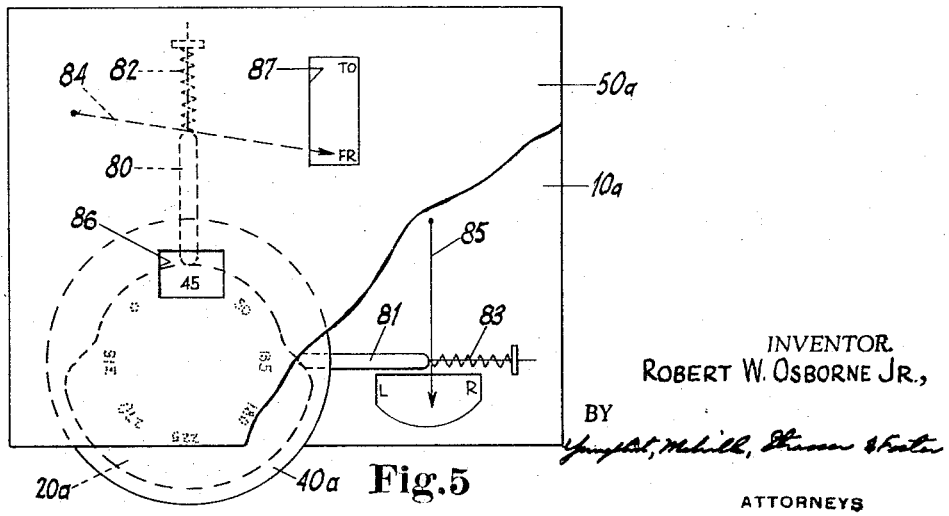
FIGURE 5 is a plan view partially broken away showing another embodiment of the invention.

In FIGURE 5, a modification of the invention is shown, somewhat schematically. In this case, the bearing indicator 40A and the cam 20A (note that in this case the camming surface is formed on the exterior of the cam 20A) are pivotally mounted in a housing 10A. Spaced apart by approximately 90° of rotation, and spring urged against the surface of the cam 20A are the cam followers 80 and 81. It will be noted that the camming surface of the cam 20A is in all respects identical with that for the internal camming surface on the cam 20 described above. It will also be noted that the cam followers, in that they are spaced apart by substantially 90° of rotation, will assume the same relative position. That is, for example, the cam follower 80 will be in one extreme position at the same time the cam follower 81 will be in an intermediate position.

Pivotally mounted on the housing 10A are the needle indicators 84 and 85, which respectively, are engaged between the cam follower 80 and spring 82, and between the cam follower 81 and spring 83. It will therefore be apparent that movement of the cam followers 80 and 81 respectively will impart movement to the indicator needles 84 and 85. The entire assembly described above may be covered by a suitable plate 50A, provided with the apertures 86 and 87, and an aperture for the "Left-Right" needle which is not shown.

It will also be necessary to provide a pin or the like (not shown) which can be used to secure the cam 20A and the bearing indicator 40A together for common rotation, but which may be removed, so that these two elements may rotate independently to set up the instrument.

Other modifications may be made in this invention without departing from its scope and spirit; hence no limitations are intended except insofar as set forth in the following claims.

The embodiments of the invention in which an exclusive property or privilege is claimed, are defined as follows:

1. A mechanical simulator comprising:
   (a) a housing;
   (b) means for indicating the bearing of an aircraft with respect to one or more ground radio stations in said housing;
   (c) a cam movable selectively with said bearing indicating means and independently of said bearing indicating means;
   (d) means for selectively moving said cam with said bearing indicating means and independently of said bearing indicating means;
   (e) a first cam follower; and
   (f) first indicator means responsive to movement of said first cam follower.

2. The mechanical simulator claimed in claim 1 wherein said bearing indicating means comprises a gear having indicia thereon, and wherein said cam comprises a ring gear having the same outside diameter of said bearing indicating means, the inner peripheral surface of said ring gear providing a camming surface.

3. The mechanical simulator claimed in claim 2 wherein said means for selectively moving said cam with said bearing indicating means and independently of said bearing indicating means comprises a driving gear, and resilient means normally urging said driving gear to a position in meshing engagement with both said bearing indicating means and said cam.

4. The mechanical simulator claimed in claim 3 including a second cam follower, and a second indicator means responsive to movement of said second cam follower.

5. The mechanical simulator as claimed in claim 4 wherein said indicator means responsive to one of said cam followers comprises a mark on said cam follower, and first and second window means in registration with at least a portion of said mark at each of the extreme positions of said cam follower, whereby said mark appears on only one of said window means at a time.

6. The mechanical simulator as claimed in claim 4 wherein said indicator means responsive to one of said cam followers comprises a needle pivotally mounted in said housing, a finger secured to said needle in parallel, spaced apart relation to the pivotal axis of said needle, said finger being operatively secured to said one of said cam followers.

7. The mechanical simulator as claimed in claim 4 wherein said cam followers are in crossed, interlocking relationship, each of said cam followers being reciprocable along a path of travel.

References Cited

UNITED STATES PATENTS

| | | | |
|---|---|---|---|
| 2,443,076 | 6/1948 | Lowkrantz | 35—12 |
| 3,124,115 | 3/1964 | Voorhies | 74—569 X |
| 3,303,833 | 2/1967 | Melling | 74—569 X |

MALCOLM A. MORRISON, *Primary Examiner.*

T. J. PAINTER, *Assistant Examiner.*